(12) United States Patent  
Samuelsson

(10) Patent No.: US 7,341,130 B2
(45) Date of Patent: Mar. 11, 2008

(54) PROTECTIVE SHIELD FOR A DISC BRAKE AND A DISC BRAKE INCLUDING SUCH A PROTECTIVE SHIELD

(75) Inventor: Ulf Samuelsson, Södertälje (SE)

(73) Assignee: Scania CV AB (publ) (SE)

( * ) Notice: Subject to any disclaimer, the term of this patent is extended or adjusted under 35 U.S.C. 154(b) by 100 days.

(21) Appl. No.: 10/535,049

(22) PCT Filed: Nov. 18, 2003

(86) PCT No.: PCT/SE03/01782

§ 371 (c)(1),
(2), (4) Date: Jun. 15, 2005

(87) PCT Pub. No.: WO2004/046578

PCT Pub. Date: Jun. 3, 2004

(65) Prior Publication Data

US 2006/0049004 A1    Mar. 9, 2006

(30) Foreign Application Priority Data

Nov. 21, 2002  (SE)  .................................... 0203441

(51) Int. Cl.
F16D 65/00     (2006.01)
B60B 7/00      (2006.01)
(52) U.S. Cl. .............................. 188/218 A; 188/264 W
(58) Field of Classification Search ............ 188/218 A, 188/264 W, 71.1, 71.6, 218 XL, 264 R, 264 A, 188/264 AA
See application file for complete search history.

(56) References Cited

U.S. PATENT DOCUMENTS

| 4,005,768 | A | * | 2/1977 | Bubnash et al. ......... 188/218 A |
| RE29,509 | E | * | 1/1978 | Pauwels et al. ............. 310/168 |
| 4,155,601 | A | * | 5/1979 | Ito .............................. 301/6.8 |
| 4,207,971 | A | * | 6/1980 | Ishikawa et al. ......... 188/218 A |
| 4,226,308 | A | * | 10/1980 | Nishiyama et al. ...... 188/218 A |
| 4,317,508 | A | * | 3/1982 | Katagiri et al. .......... 188/218 A |
| 4,326,610 | A | * | 4/1982 | Mouza .................... 188/218 A |
| 4,473,139 | A | * | 9/1984 | Oka et al. .................. 188/71.6 |
| 4,596,312 | A | * | 6/1986 | Kawaguchi ............... 188/18 A |
| 5,671,827 | A | * | 9/1997 | Demetriou et al. ........ 188/71.6 |
| 6,296,086 | B1 | * | 10/2001 | Reuber et al. .......... 188/218 A |
| 6,626,272 | B2 | * | 9/2003 | Frouin .................... 188/218 A |

FOREIGN PATENT DOCUMENTS

| DE | 4344051 A1 | * | 7/1994 |
| EP | 1191245 | | 3/2002 |
| JP | 60067245 | | 4/1985 |
| JP | 6227471 | | 8/1994 |

* cited by examiner

Primary Examiner—Xuan Lan Nguyen
(74) Attorney, Agent, or Firm—Ostrolenk, Faber, Gerb & Soffen, LLP

(57) ABSTRACT

A protective shield for a disc brake which includes a brake disc attached to a wheelshaft for a vehicle, and a brake yoke with a pair of brake supports. The protective shield is fitted close to one side of, and partly covers laterally, the brake disc. The protective shield has a protective plate and a fastening bracket portion which is designed to support and fasten the plate, and the fastening bracket portion is provided with end portions for fastening cooperation with fastening eyes in the brake supports.

14 Claims, 4 Drawing Sheets

PROTECTIVE SHIELD FOR A DISC BRAKE AND A DISC BRAKE INCLUDING SUCH A PROTECTIVE SHIELD

CROSS REFERENCE TO RELATED APPLICATION

The present application is a 35 U.S.C. §§ 371 national phase conversion of PCT/SE2003/001782 filed Nov. 18, 2003, which claims priority of Swedish Application No. 0203441-1 filed Nov. 21, 2002. The PCT International Application was published in the English language.

TECHNICAL FIELD

The present invention relates to a protective shield for a disc brake and to a disc brake unit including such a protective shield.

Moreover, differences in braking action and consequently uneven wear of brake linings may occur on the different sides of a disc if the linings are contaminated to different extents. All in all, in the state of the art, these problems reduce the usability of disc brakes and shorten service intervals, thereby increasing costs. This situation has also led to otherwise less efficient drum brakes being regarded as more reliable and as requiring less servicing.

Various attempts at alleviating the problems of disc brakes have resulted in shaft-mounted protection surrounding the brake disc, but this has entailed problems of impaired cooling, inherent oscillations and extra unsprung weight.

Another solution which has been proposed involves sheetmetal housings fastened by means of the brake unit's threaded connections. However, this latter solution has caused problems with regard to the stability of the fastening of disc brake units.

OBJECTS AND MOST IMPORTANT CHARACTERISTICS OF THE INVENTION

One object of the present invention is to indicate a protective shield for a disc brake of the kind mentioned in the introduction, whereby the problems of the state of the art are reduced. A further object is to propose a protective shield which is economic to manufacture and fit and makes reduced weight possible while nevertheless maintaining efficient functioning.

These objects are achieved in the case of a protective shield of the kind mentioned in the introduction by the features in the characterising part of claim 1.

The possibility is thus created of a light and stable structure in which the actual protective plate may be made thin and the fastening bracket portion ensures rigidity and effective fastening. This means that only two fastening points are needed, which is an advantage, inter alia from the assembly point of view. There is also the possibility of manufacturing the protective plate unit in such a way as to eliminate or at least minimise the risk of problems arising from inherent oscillations during the operation of a vehicle fitted with it. The fact that fitting involves only two fastening points means that the invention allows a configuration which allows cooling air to flow between the wheelshaft and the protective plate unit and on along the brake disc, so that sufficient cooling can be achieved.

The fact that there is fastening cooperation with special fastening eyes in the brake supports is advantageous in that separate fastening is proposed, thereby avoiding any risk of impairing the fastenings of the disc brake unit itself.

The invention results in reduced contamination in the region of the brake disc and hence a more even braking action and more even lining wear, with overall effects of greater functional reliability and longer service intervals for the brake disc units here concerned.

The protective plate and the fastening bracket portion being separate elements means that these elements can each be optimised individually as regards material and design, so the protective plate may be made of thin sheetmetal material and the fastening bracket portion may have a rigid forceabsorbing profile.

In one aspect of the invention, the protective plate is provided with fastening regions for cooperation with a protective housing for creating an enclosing protective shield for the brake disc, which is appropriate for disc brake units which are freely mounted on a wheelshaft and are therefore not situated within the region of the rim of a vehicle wheel. In this aspect of the invention it is likewise advantageous that only two fastening points are needed, thereby simplifying fitting and affording freedom for the creation of gaps for flow of cooling air.

Further advantages are indicated in the following detailed description of an embodiment with reference to the attached drawings.

DESCRIPTION OF EMBODIMENTS

Figure 1:
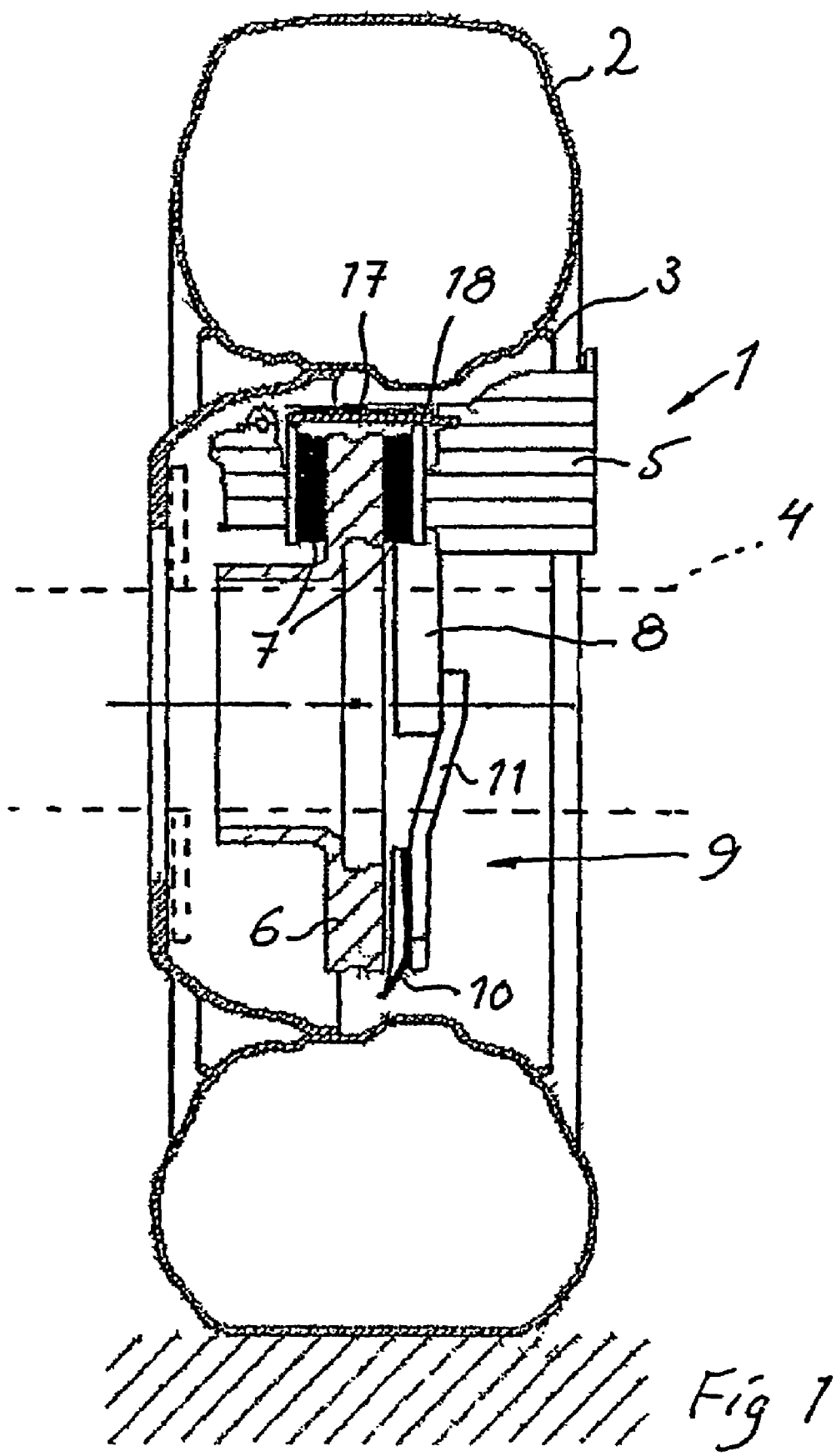
FIG. 1 depicts schematically a section through a vehicle wheel with a disc brake unit according to the invention.

FIG. 1 thus depicts in section a vehicle wheel with a disc brake unit 1 placed within the circumference of a wheel rim 3 which supports a vehicle tyre 2. Broken lines at 4 represent a wheelshaft to which the vehicle wheel is fastened.

The disc brake unit 1 comprises a brake yoke 5, a brake disc 6 fastened to the wheelshaft 4, and brake linings 7 which are arranged on brake blocks and are for braking cooperation with the brake disc 6. The brake yoke 5 comprises brake supports 8 (one depicted) for firm mounting of the brake yoke 5. Each brake support 8 has its lower region lengthened so as to be designed to constitute a fastening point for a protective shield 9 which comprises a protective plate 10 and a fastening bracket portion 11.

Figure 2:
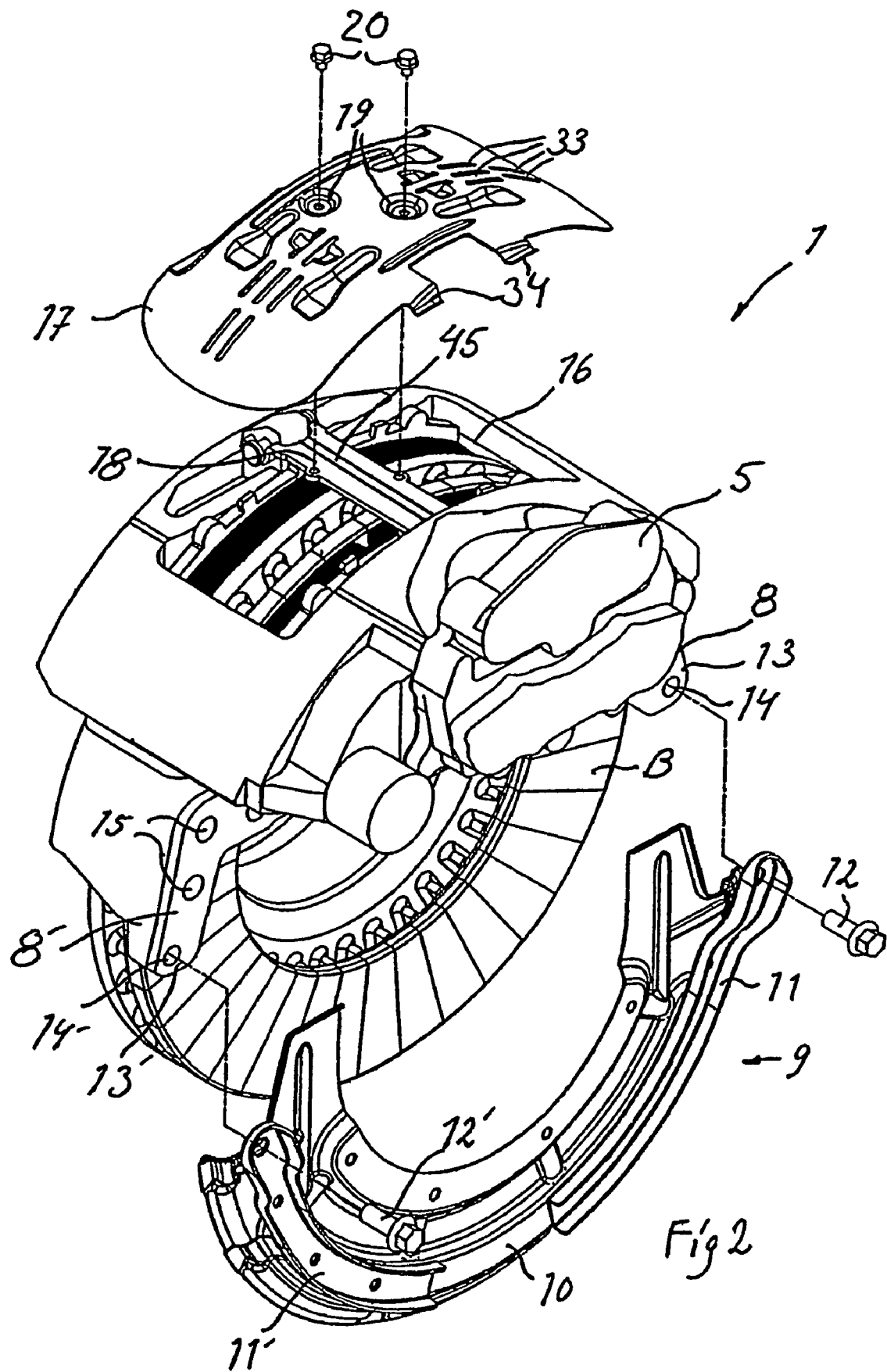
FIG. 2 depicts parts of the disc brake unit in FIG. 1 in a partly dismantled perspective view.

The parts of the disc brake unit 1 which are of relevance for the invention are shown in more detail in FIG. 2, which depicts in perspective the brake yoke 5 with its brake supports 8, 8', each of which is provided with a number of fastening holes 15 (shown in the brake support 8') for accommodating fastening bolts for the brake yoke 5. Ref. B denotes a brake disc.

The outer extremity of the free end of each brake support 8, 8' is provided with a fastening eye 13, 13' with respective fastening holes 14, 14' for fastening screws 12, 12' intended to secure a unit comprising the protective plate 10 and fastening brackets 11, 11' by cooperation with holes provided in the free end portions of the fastening brackets 11, 11'. The fastening brackets 11, 11' have a flat U-shaped cross-sectional profile and are curved so that they together substantially describe a circular arc which is at a substantially radially even distance from a wheelshaft when the brake shield is in position. The contact surface between the protective plate 10 and the fastening brackets 11, 11' is substantially planar.

The radially innermost portion of the protective plate 10 is situated at a distance from the wheelshaft (ref. 4 in FIG. 1) such that a cooling air flow can pass through the resulting gap and proceed radially along the brake disc. The radially outer periphery of the protective plate 10 is drawn somewhat inwards towards the brake disc so as to create a somewhat enclosing structure.

The brake yoke 5 has in its upper portion an open recess 16 via which brake linings are intended to be extracted when they are being changed. The recess 16 is also used for other service operations relating to the disc brake unit, and for inspection purposes.

A lining holder 18 in the form of a supporting U-bolt is placed transversely across the recess so as to extend substantially parallel with the wheelshaft. In a further aspect of the invention, this lining holder 18 is used for fixing a main cover 17 which is intended to provide dirt protection preventing the ingress of pollutants into the recess 16. To this end, the main cover 17 substantially covers the adjacent outer arcuate section of the brake yoke. The main cover comprises a thin sheetmetal structure designed to cover said recess. The fastening of the main cover is by fastening cooperation with the lining holder 18 whereby fastening screws 20 are inserted in countersunk recesses 19 with holes running through the main cover 17 and are screwed firmly into the lining holder 18.

The main cover 17 is also provided with tabs 34 intended to cooperate with and protect indicating cables (not depicted) for indicating the state of wear of the brake linings.

A multiplicity of ventilation slits 33 are arranged in the main cover to allow flow of air which has been used for cooling and which emanates from the region of the disc brake during operation of the vehicle. Cooling of the brake unit is thus promoted despite the presence of the main cover.

Figure 3:
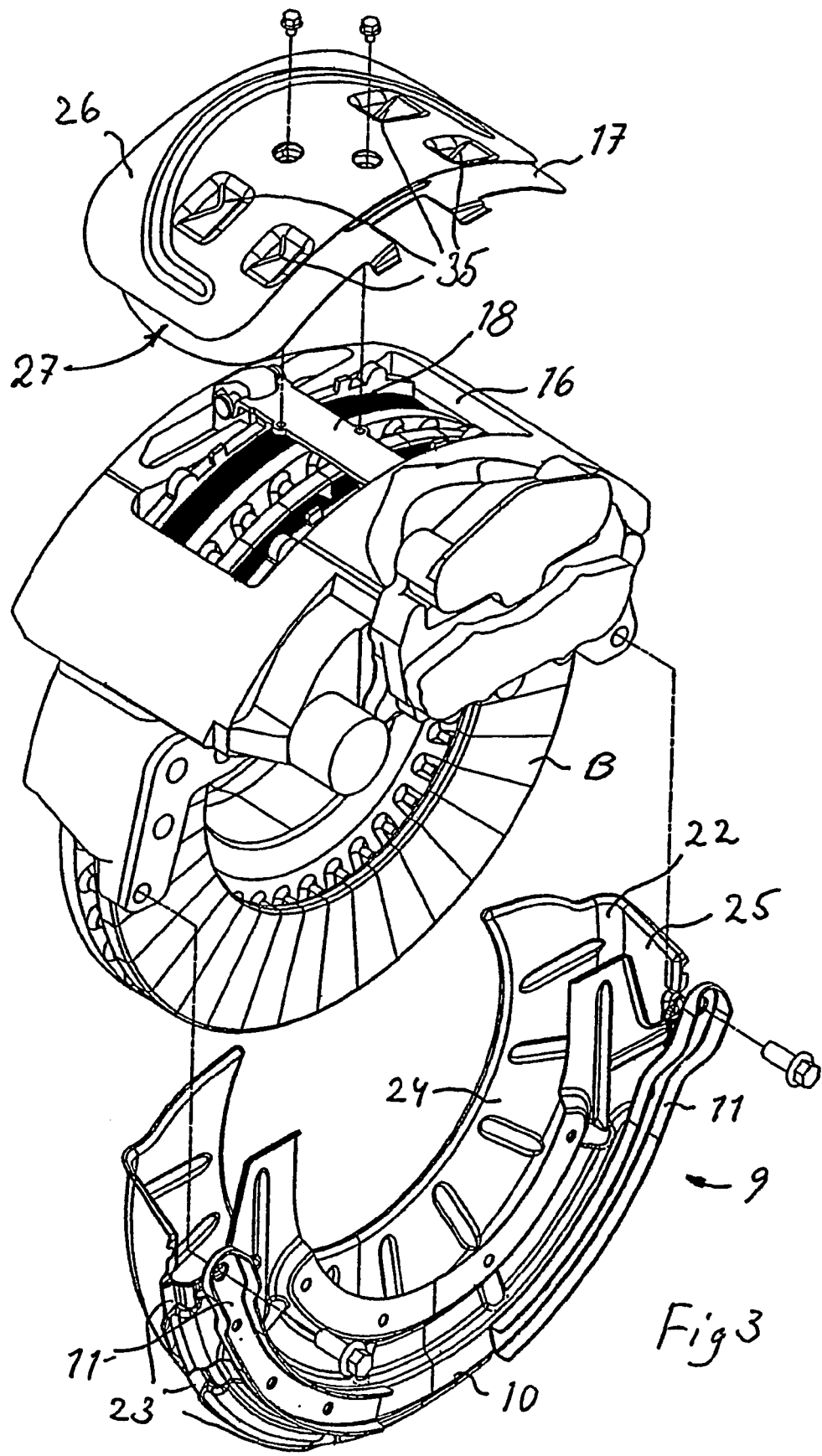
FIG. 3 depicts a partly dismantled perspective view of an alternative embodiment of a disc brake unit according to the invention.

FIG. 3 depicts another embodiment of the invention whereby fastening regions 23 distributed along the peripheral region of the protective plate 10 are used for fastening a protective housing 22. The latter comprises a first portion 24 which runs substantially parallel with the protective plate 10, and a second portion 25 which runs, in a manner surrounding the brake disc, substantially at right angles to the first portion 24 and the protective plate 10. A structure enclosing both sides and the circumference of the brake disc is thus formed.

The fastening regions 23 are matched by corresponding portions of the protective housing 22, and joining together is done, for example, by spot welding or by upset riveting.

Adding the protective housing 22 is applicable in the case of a single-mounted wheel, which means that the brake disc is protected from contamination in all directions, which is otherwise protected by the rim of a vehicle wheel.

In its upper region directed towards the brake yoke 5, the protective housing 22, as also the protective plate 10, is adapted to connecting closely adjacent portions of the brake yoke 5 while leaving a gap for flow of cooling air towards an adjacent wheelshaft (not depicted).

At its upper portion, the brake disc unit in the case of a single-mounted wheel is supplemented by fitting an additional outer cover 26 outside the main cover 17. This outer cover 26 is at a substantially even distance from the main cover 17 so as to leave an air gap 27 between the main cover 17 and the outer cover 26. To this end, the outer cover 26 has a number of spacing portions 35 which help to maintain the continuity of the air gap 27. The spacing portions 35 also serve as regions for joining together the main cover and the outer cover, e.g. by upset riveting.

The object of the outer cover 26 is to protect the disc brake unit 1 from ingress of dirt, water etc. via the slits 33 in the main cover 17 (see FIG. 2). The fastening of the outer cover 26 to a main cover is advantageously effected by the same fastening screws as for the main cover 17 as individual parts of the lining holder 18. Advantageously, both the main cover 17 and the outer cover 26 are manufactured as pressed sheetmetal parts.

Figure 4:
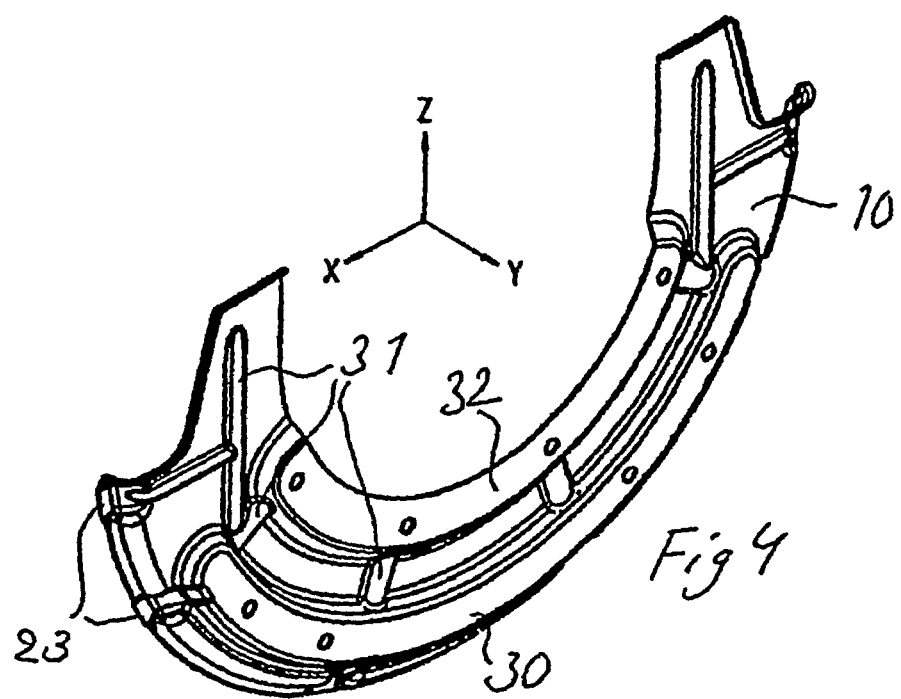
FIG. 4 depicts a protective plate for a disc brake unit according to the invention.

FIG. 4 depicts the protective plate 10 in more detail with, pressed into it, a number of reinforcing grooves 31 which are distributed and differently aligned and contribute to the rigidity of the protective plate 10. Ref. 30 denotes a substantially planar abutment surface 30 which is made by being pressed in a press tool and is for cooperation with the fastening brackets 11 and 11' of the fastening bracket portion (FIG. 2). This structure forming the abutment surface 30, which moreover, as indicated above, describes substantially a circular arc, does of course also contribute to the rigidity of the protective plate 10. Also depicted is a further abutment surface 32 for an undepicted additional part which relates to the special fitting of the device to certain wheelshafts.

Figure 5:
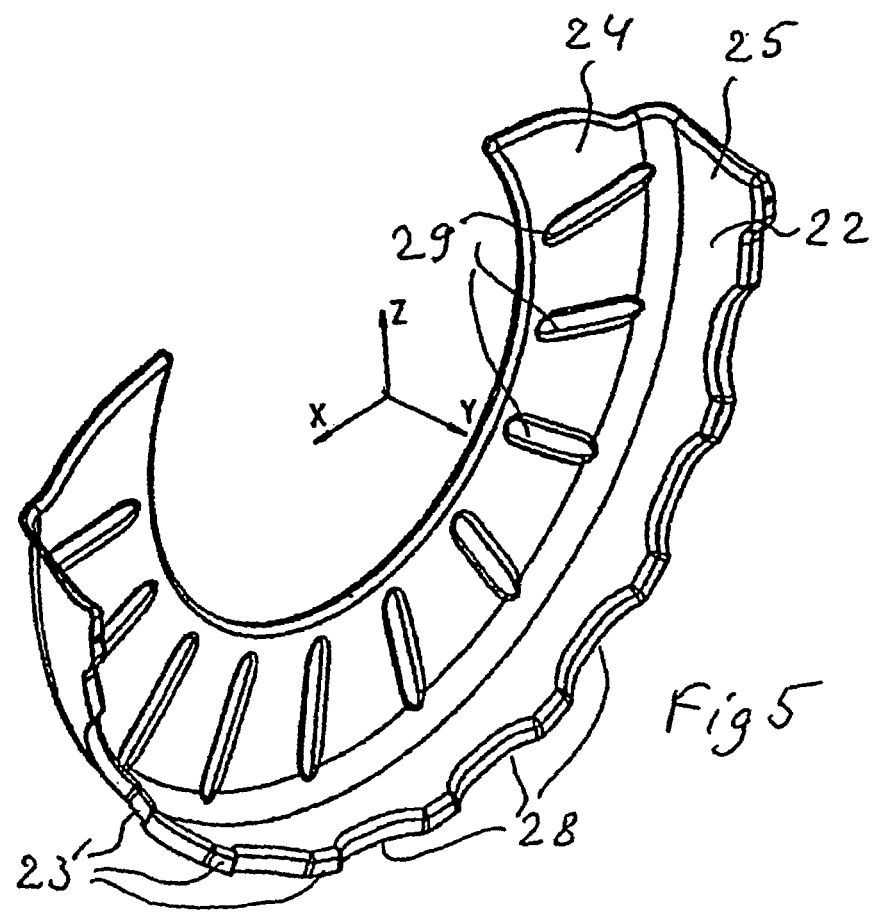
FIG. 5 depicts in perspective a protective housing for a disc brake unit according to the invention.

FIG. 5 shows the protective housing 22 in more detail with reinforcing grooves 29 running radially and with its first and second portions 24 and 25 respectively. Ref. 23' denotes other fastening regions for cooperation with the fastening regions 23 on the protective plate 10 (FIG. 3). Between these joining regions 23' there are recesses 28 which, when the protective housing 22 is fitted to a protective plate 10, constitute apertures allowing the outflow of air which has been used for cooling a brake disc during vehicle operation.

The invention may be modified within the scopes of the ensuing claims whereby the constituent parts may be configured otherwise, e.g. so that the bracket portion comprises a single fastening bracket which is permanently or detachably fastened to the protective plate. The brackets may also be configured otherwise, e.g. with some other cross-section or some other curvature, and be manufactured by some other appropriate production method.

The invention represents a flexible solution which makes it possible to use the same protective shield on all the axles of a vehicle, which is a very great advantage in simplifying manufacture, assembly and stockholding and in reducing the overall cost of brake disc units which include the invention.

It is preferable that the protective shield and the main cover be used in combination, but it is not excluded that either may be used without the other.

Applying the invention to a disc brake results in significant improvements as regards service life and function. It also results in more even brake lining wear and consequently longer service intervals between brake lining changes.

The invention claimed is:

1. A disc brake unit comprising:
   a wheelshaft for a vehicle;
   a brake disc coupled to the wheelshaft;
   a brake yoke coupled to the wheelshaft, the brake yoke having first and second brake supports, the first brake support having a first fastening element, and the second brake support having a second fastening element;

at least one fastening bracket having at least one end portion for fastening cooperation with respective fastening elements of the at least one brake support; and a protective plate for laterally covering at least part of the brake disc, the protective plate having first and second major surfaces, the second major surface of the protective plate being attached to the at least one fastening bracket such that the first major surface of the protective plate is situated at the brake disc, wherein the protective plate and the at least one fastening bracket are separate elements which are united with each other, wherein the at least one fastening bracket is made of pressed sheetmetal and is substantially U-shaped in cross-section.

2. A disc brake unit according to claim 1, wherein there are two separate fastening brackets each having first and second ends, the first ends each having respective third fastening elements cooperating with a respective fastening element of the first and second brake supports, such that the second ends of the fastening brackets are adjacent.

3. A disc brake unit according to claim 1, wherein the protective plate is a pressed sheetmetal part.

4. A disc brake unit according to claim 1, wherein the protective plate has reinforcing ribs pressed into it.

5. A disc brake unit according to claim 1, further comprising:

a protective housing; and peripherally distributed fastening regions in the protective plate for fastening cooperation with the protective housing such that at least part of the brake disc is located between the protective housing and the protective plate.

6. A disc brake unit according to claim 5, wherein the protective housing is a pressed sheetmetal part.

7. A disc brake unit according to claim 5, wherein there are apertures located in the protective housing for allowing the circulation of air.

8. A disc brake unit according to claim 1, further comprising rivets attaching the protective plate and the at least one fastening bracket to each other.

9. The disc brake unit according to claim 1, wherein the at least one fastening bracket extends along an outer periphery of the protective plate.

10. The disc brake unit according to claim 1, further comprising:

a lining holder coupled to the brake yoke; and a main cover fastened to the lining holder.

11. The disc brake unit according to claim 2, wherein an area of the second major surface of the protective plate is greater than an area of an adjacent surface of each of the fastening brackets.

12. The disc brake unit according to claim 2, wherein the fastening brackets and the protective plates are C-shaped.

13. The disc brake unit in claim 1, wherein the first and second fastening elements are fastening eyes.

14. The disc brake unit in claim 13, wherein there are two separate fastening brackets each having first and second ends, the first ends each having a respective third fastening element cooperating with said respective fastening eye of the first and second brake supports, such that the second ends of the fastening brackets are adjacent.

* * * * *